May 6, 1958

R. E. DENCH ET AL 2,833,019

MACHINE FOR PRODUCING BLOCKS OR SLABS OF
BREEZE, CONCRETE OR OTHER
AGGREGATE OR MATERIAL

Filed March 21, 1955

3 Sheets-Sheet 1

Inventors
R. E. Dench
G. A. Lee
By Glascock Downing Seebold
Attys.

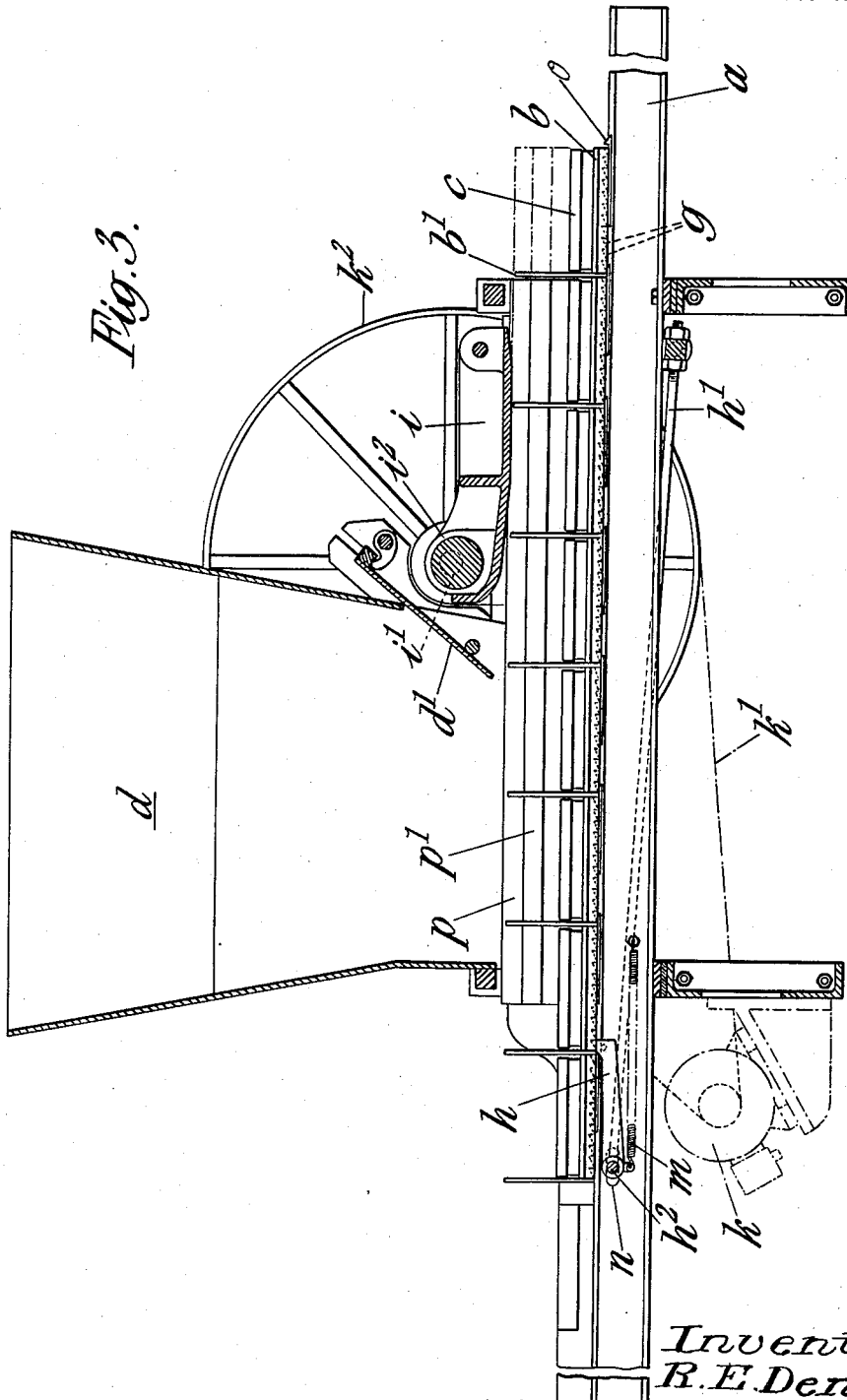

United States Patent Office 2,833,019
Patented May 6, 1958

2,833,019

MACHINE FOR PRODUCING BLOCKS OR SLABS OF BREEZE, CONCRETE OR OTHER AGGREGATE OR MATERIAL

Ronald Ernest Dench and George Arthur Lee, Cuffley, England, assignors to Arthur William Peck, Cuffley, England Application March 21, 1955, Serial No. 495,598

Claims priority, application Great Britain March 22, 1954

4 Claims. (Cl. 25—41)

This invention relates to means for producing building, paving or like blocks of breeze, concrete or other aggregate or material, and is applicable also to the making of bricks.

The object of the present invention is to enable such blocks or slabs to be readily and rapidly produced to any desired or standard specification, the cost of such production being very materially reduced due to the increased output of a machine in accordance with the invention as compared with existing machines.

The invention consists in a machine for producing blocks or slabs of the nature indicated above embodying features as set forth in the claims appended hereto.

The accompanying drawings illustrate one convenient form of machine in accordance with the invention.

Figure 1:
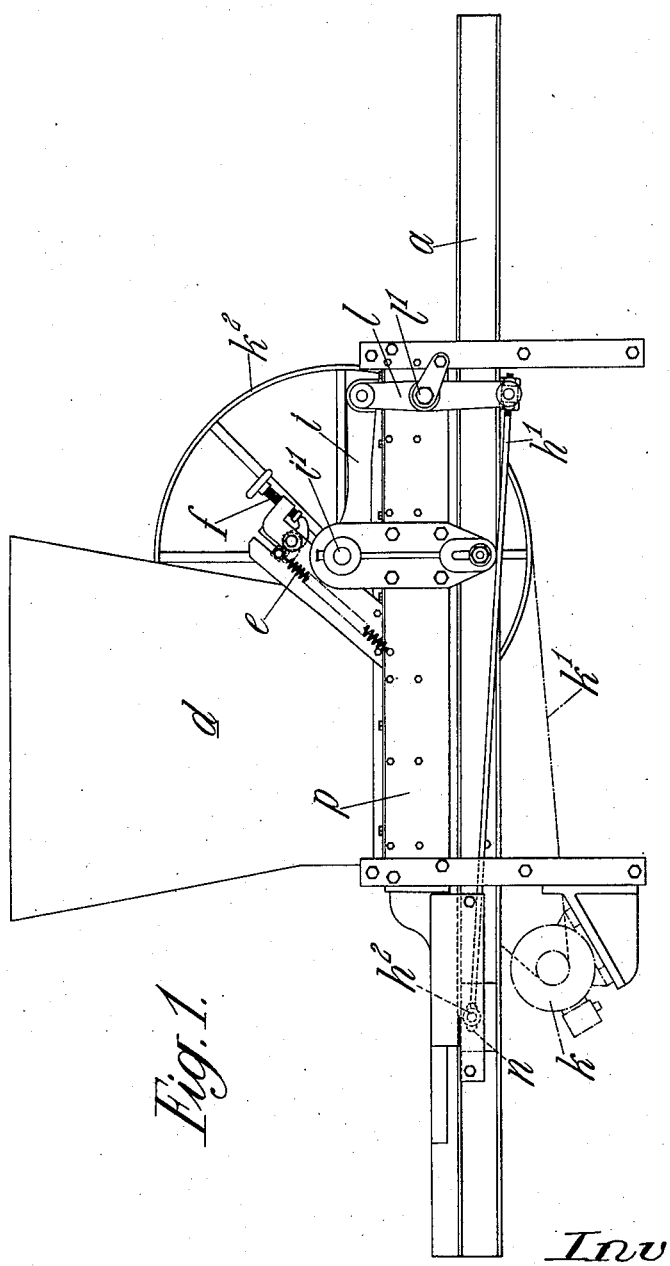
Figure 2:
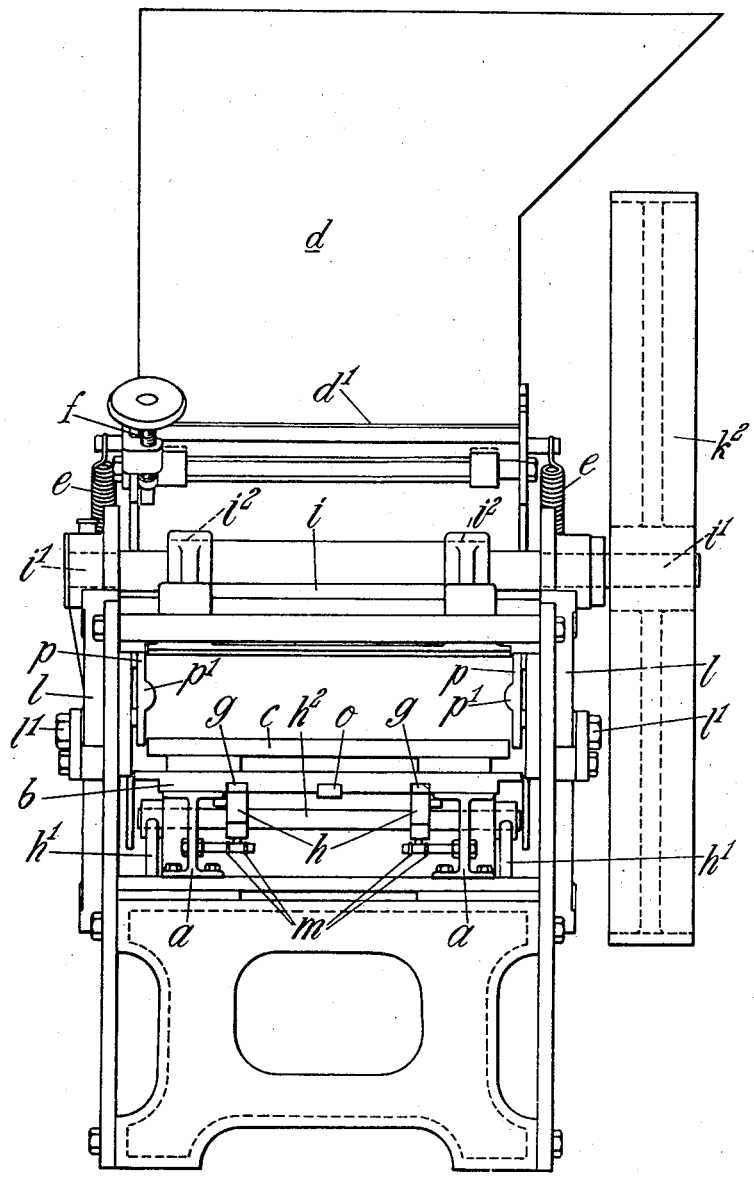

Figure 1 is a side elevation;
Figure 2 is an end elevation; and
Figure 3 is a longitudinal sectional elevation.

In carrying our invention into effect in one convenient manner we form our improved machine with a foundation, support or framework comprising slides $a$ on which may be slidably mounted a plurality of carrier units $b$ formed of metal or other suitable material. Each carrier unit is formed with a separator plate $b^1$ extending vertically from the unit, the arrangement being such that when a plurality of carrier units is assembled in series consecutive separator plates form a moulding space, the size of which is determined by the size of the block or slab to be produced. In each moulding space and supported upon the carrier unit is a pallet $c$ which may be of any usual or suitable form constructed of metal or wood or a combination of such materials.

Above the moulding spaces is a hopper $d$ into which the aggregate or other material is charged, the arrangement being such that as the carrier units are moved moved through the machine successive moulding spaces are charged with the material from which the blocks or slabs are to be made. The hopper has associated with it a control plate $d^1$ urged downwardly towards the moulding spaces by suitable spring means $e$ the control plate being preferably adjustable by a screw member $f$ or other means. The function of the control plate is to allow only the correct quantity of material to remain in a moulding space in order to give the required density of finished block. By arranging for the control plate to be spring-loaded easy adjustment is possible and any large pieces of material which may be included in the aggregate can cause no damage by being trapped between the control plate $d^1$ and the separator plates $b^1$ between the blocks.

Each unit is furnished with two sets of ratchet teeth $g$ with which engage two pawls $h$ actuated by suitable means. The machine will be provided with a tamping plate $i$ for compressing the material within the moulding spaces, such tamping plate being operated by a crank, cam, eccentric, or other means such that the plate has a combined compressive and wiping action on the material in the moulds, and in accordance with the invention the tamping plate is connected by suitable linkage (which may be adjustable) with the pawls above referred to so that movement of the carrier units is synchronised with the movement of the tamping plate.

In the particular construction shown, the machine embodies an electric motor $k$ connected by a driving belt $k^1$ to a pulley $k^2$ mounted on a shaft $i^1$ on which is the eccentric $i^2$ for operating the tamping plate $i$. The tamping plate has pivoted at each side one end of a double-ended lever $l$, the levers being pivoted to the framework at $l^1$, and to the other end of each lever is pivoted a link $h^1$ connected to its respective pawl $h$. The pawls are controlled by springs $m$, and the shaft $h^2$ on which they are carried passes through slots $n$ in the frame to permit of the necessary forward and backward movements of the pawls.

It will however be understood that these details are given purely by way of example and any other suitable means may be adopted for synchronising the movements of the carrier units and tamping plate.

When a finished block emerges from the machine it is removed with its pallet from the carrier unit and the latter is then returned by hand to the receiving end of the machine and equipped with a new pallet.

Usually a number of spare carrier units will be provided at the inlet end of the machine and a spring latch $o$ or gravity catch or the like with which each carrier unit is provided, connects the carrier units to prevent any separation caused by compression of the material and also draws in as many loaded carrier units as are available at the said inlet end.

In the construction shown the carrier units move between two side plaes $p$ having ribs $p^1$ thereon to shape the size of the blocks, but of course these are not necessary When applying the invention to the making of bricks or like smaller blocks, the moulding spaces may be subdivided and there may be a corresponding number of smaller tamping plates (all driven by the same eccentric or the like) to deal with the material in the mould.

It will be obvious that the machine is capable of a very large output and due to the arrangement adopted for moving the carrier units no clutch or other stopping mechanism is required when further supplies of such units are not immediately available. Moreover, as the feed of material stops when the flow of carrier units stops the tamping plate can run freely without doing any damage so that frequent starting and stopping of the machine is unnecessary.

In a modification of the invention we may arrange for the carrier units to be moved through the machine on an endless chain or by gravity feed and generally it will be understood that the invention is not limited to the foregoing details of construction which are given to describe the nature of the invention and not to limit its scope.

We claim:

1. In a machine for producing blocks or slabs of the type described, a plurality of moulds, horizontal support means along which said moulds are adapted to travel, a hopper for moulding material mounted on the support means above said moulds, said hopper having an outlet for charging the moulds with material and entrance and exit means allowing the moulds to move past said hopper, a tamping plate located adjacent said hopper exit means for tamping material in the moulds after the same have passed through said exit means, power operated means operatively connected to said moulds to impart a stepwise movement to the moulds along the supporting means past the hopper, means operatively connected to the tamping plate to reciprocate said plate toward and away from the moulds and in the direction of movement of the moulds, and mechanical means interconnecting said power operated means and said reciprocating means for the tamping plate operative to move the tamping plate towards a mould and in the direction of movement of the mould to effect a compressive and wiping action on the material in the mould during interruption of the mould movement and to move the tamping plate away from the mould during movement of the molds along the supporting means.

2. A machine according to claim 1, in which one end of the tamping plate is supported upon one arm of a pivotally mounted double-armed lever, and said mechanical means includes an operative connection between the other arm of said lever and a ratchet mechanism which constitutes the power operated means for effecting stepwise feed of the moulds.

3. A machine according to claim 1, in which the moulds each comprise a carrier unit adapted to receive a pallet on which a block or slab is moulded, each carrier being provided with a separator plate whereby consecutive plates form therebetween a moulding space above the pallet.

4. A machine according to claim 1, in which the moulds comprise carrier units having ratchet teeth on their underside, feed pawl means for engaging said ratchet teeth, said teeth and feed pawl means constituting the means imparting a stepwise movement to the moulds, and said mechanical means including an operative connection between said feed pawl means and the tamping plate for feeding the moulds.

References Cited in the file of this patent

UNITED STATES PATENTS

| | | |
|---|---|---|
| 1,330,172 | Crozier | Feb. 10, 1920 |
| 1,688,205 | Phillips et al. | Oct. 16, 1928 |
| 1,782,413 | Dietrichs | Nov. 25, 1930 |
| 1,908,640 | Dunn | May 9, 1933 |
| 1,921,003 | Romie | Aug. 8, 1933 |